(No Model.)
J. THOMSON.
PROPORTIONAL WATER METER.
No. 476,094. Patented May 31, 1892.
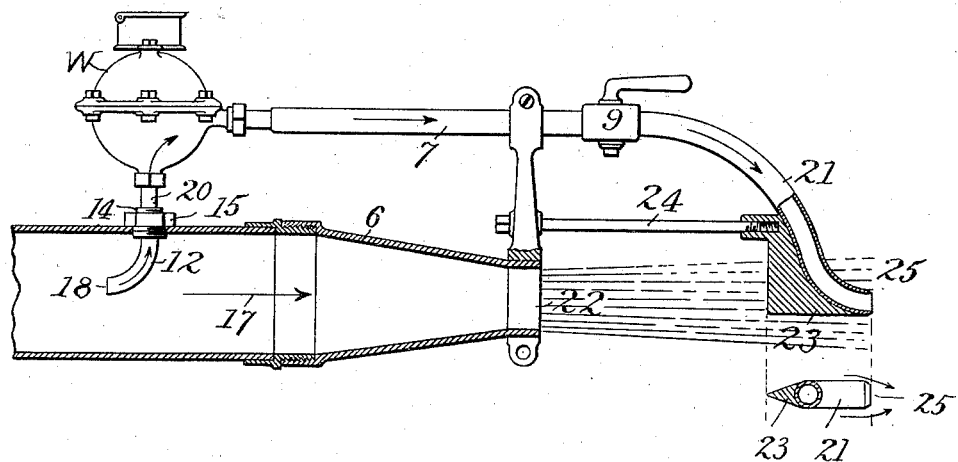

UNITED STATES PATENT OFFICE.

JOHN THOMSON, OF BROOKLYN, ASSIGNOR TO THE THOMSON METER COMPANY, OF NEW YORK, N. Y.

PROPORTIONAL WATER-METER.

SPECIFICATION forming part of Letters Patent No. 476,094, dated May 31, 1892.

Application filed May 7, 1891. Serial No. 391,899. (No model.)

*To all whom it may concern:*

Be it known that I, JOHN THOMSON, a citizen of the United States, residing in Brooklyn, Kings county, State of New York, have invented certain new and useful Improvements in Proportional Water-Meters, of which the following is a specification.

The apparatus constituting the subject of this specification is an inferential proportional water-meter. The principle of operation is to shunt a small portion of the whole stream, to measure the shunted quantity accurately by means of a relatively small water-meter, and thus infer the total discharge. The meter is in truth a gage recording changes in the dynamic condition by measurement of a proportional quantity, but set under conditions which are believed to be conducive to a higher degree of accuracy, certainty of action, and durability than would be the case in the instance of an ordinary gage indicating changes in the dynamic condition by observing the pressure.

In the accompanying drawing the figure is a partial side elevation and longitudinal center section illustrating the conditions just referred to, showing the application of the apparatus to a nozzle 6, discharging into the open air.

Thus in the drawing, W represents an ordinary water-meter without any change in its construction, which is placed in the circuit of a shunt-pipe 7, which pipe is directly connected to the nozzle by the pipe 20 on the inlet side of the meter, and the shunt-pipe is provided with a stop-cock 9, while the outlet-tube thereon beyond the stop-cock is bent and discharges into the stream out of and beyond the nozzle 22. Secured to the back of the end of the outlet-tube 21 is a rib 23, which is finished to a knife-edge at the back, the more readily to deflect the water past the sides of the outlet-pipe. The tie-rod 24 between the bracket and the plate is to stiffen the structure.

The pipe 20 is preferably secured in a stuffing-box 14, contained in the nut 15, which is secured to the nozzle, and the end of the tube is curved so as to bring its opening horizontal to the line of flow in the nozzle, (indicated by the arrow 17,) the opening 18 of the bent portion 12 of the inlet-tube being presented toward and opposed to the current, while the discharge-opening of the pipe 21 is pointed in the opposite direction.

It will be seen that the dynamic effect capable of being produced upon the meter may be very great for the reasons that we have direct pressure upon the inlet side of the meter and suction upon the outlet thereof, due to the water flowing past the edge 25 of the outlet-tube acting in accordance with the principle of the injector to cause secondary flow by induction.

It is not to be overlooked that the introduction of the tubes within the nozzle is, in fact, an obstruction to the full flow, thus intensifying the pressure upon the inlet-tube and the induction upon the outlet-tube. Hence we have the necessary conditions—namely, ample difference of pressure between the inlet and the outlet of the meter—to produce in it the most uniformly accurate results as to its operations. The calibration of the meter may be readily obtained by delivering at different rates of flow into a receptacle of known capacity, or more accurately by weighing the water, when, if the indications made by the register of the meter are uniform, a coefficient is established to obtain from the fixed automatic record of the meter the total quantity of future deliveries.

Without limiting myself to the precise construction and arrangement of parts shown and described, I claim—

The combination, substantially as hereinbefore set forth, with the nozzle, of a shunt-pipe connected to the nozzle and including a meter therein, and a discharge-pipe for said meter terminating in the open stream beyond the outlet end of the nozzle.

In testimony whereof I have signed my name to this specification in the presence of two subscribing witnesses.

JOHN THOMSON.

Witnesses:
F. A. LORECRAFT,
HENRY C. FOLGER.